(12) United States Patent
Burton et al.

(10) Patent No.: US 7,185,222 B2
(45) Date of Patent: Feb. 27, 2007

(54) APPARATUS, SYSTEM, AND METHOD FOR MAINTAINING DATA IN A STORAGE ARRAY

(75) Inventors: David Alan Burton, Vail, AZ (US); Joseph Paul Hughes, Boulder, CO (US); Noel Simen Otterness, Lafayette, CO (US); Bruce A. Woller, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 10/713,950

(22) Filed: Nov. 14, 2003

(65) Prior Publication Data

US 2005/0120267 A1  Jun. 2, 2005

(51) Int. Cl.
G06F 11/00 (2006.01)
(52) U.S. Cl. .......................................................... 714/5
(58) Field of Classification Search ...................... None
See application file for complete search history.

(56) References Cited

U.S. PATENT DOCUMENTS

| | | | |
|---|---|---|---|
| 5,166,936 A * | 11/1992 | Ewert et al. ................. 714/723 |
| 5,437,022 A * | 7/1995 | Beardsley et al. .............. 714/6 |
| 5,479,653 A * | 12/1995 | Jones ............................. 714/5 |
| 5,574,856 A * | 11/1996 | Morgan et al. ................ 714/52 |
| 5,862,158 A | 1/1999 | Baylor et al. ............... 371/49.1 |
| 5,870,630 A | 2/1999 | Reasoner et al. ............ 395/894 |
| 5,895,485 A * | 4/1999 | Loechel et al. .............. 711/119 |
| RE36,846 E | 8/2000 | Ng et al. ........................ 714/6 |
| 6,101,615 A | 8/2000 | Lyons ............................. 714/6 |
| 6,151,665 A | 11/2000 | Blumenau ..................... 711/162 |
| 6,154,853 A * | 11/2000 | Kedem ........................... 714/6 |
| 6,216,211 B1 | 4/2001 | McBrearty et al. ......... 711/162 |
| 6,223,252 B1 * | 4/2001 | Bandera et al. ............. 711/114 |
| 6,243,827 B1 * | 6/2001 | Renner, Jr. ..................... 714/6 |
| 6,269,453 B1 | 7/2001 | Krantz ........................ 714/6 |
| 6,272,442 B1 | 8/2001 | Jeffries ....................... 702/115 |
| 6,282,670 B1 | 8/2001 | Rezaul Islam et al. ......... 714/6 |

(Continued)

OTHER PUBLICATIONS

TDB v36 n3 Mar. 1993 p. 473-478 "Parity Preservation for Radundant Array of Independent Direct Access Storage Device Data Loss Minimization and Repair" C.V. Crews, D.C. Mairet and D. A. Styczinski.

(Continued)

*Primary Examiner*—Robert W. Beausoliel, Jr.
*Assistant Examiner*—Elmira Mehrmanesh
(74) *Attorney, Agent, or Firm*—Kunzler & Associates (57) ABSTRACT

An apparatus, system, and process are disclosed for maintaining data in an electronic storage array during multiple, concurrent drive failures. A first drive failure is recognized and the storage system controller subsequently enters a first operating mode. The storage system controller then recognizes a second drive failure and enters a second operating mode, which is different from the first operating mode, in response to the second drive failure. The second operating mode allows the storage system controller and a recovery module to access the data of the second failed drive in a controlled manner in order to attempt to recover the data on the first failed drive. Also, a pinned data module may allow write data to be written to a pinned data drive, instead of a failed drive, while the storage system controller is operating in the second operating mode.

30 Claims, 7 Drawing Sheets

U.S. PATENT DOCUMENTS

| | | | |
|---|---|---|---|
| 6,304,941 B1 * | 10/2001 | Lyons et al. | 711/114 |
| 6,327,672 B1 * | 12/2001 | Wilner | 714/6 |
| 6,651,183 B1 * | 11/2003 | Gensler et al. | 714/4 |
| 6,681,339 B2 * | 1/2004 | McKean et al. | 714/5 |
| 6,751,136 B2 * | 6/2004 | Hetrick et al. | 365/200 |
| 6,880,101 B2 * | 4/2005 | Golasky et al. | 714/4 |
| 6,990,611 B2 * | 1/2006 | Busser | 714/42 |
| 2002/0049923 A1 * | 4/2002 | Kanazawa et al. | 714/5 |

OTHER PUBLICATIONS

TDB v38 n6 Jun. 1995 p. 203-206 "Fault-Tolerant Control for DASD Arrays" N.K.Ouchi.

* cited by examiner

APPARATUS, SYSTEM, AND METHOD FOR MAINTAINING DATA IN A STORAGE ARRAY

BACKGROUND OF THE INVENTION

1. Field of the Invention

This invention relates to an electronic storage array and particularly to maintaining data in an electronic storage array during multiple, concurrent drive failures within the electronic storage array.

2. Description of the Related Art

One requirement of contemporary distributed data storage systems, such as a redundant array of independent disks (RAID) storage system, is to try to maintain data availability throughout a large number of drive failure scenarios. In one scenario, it is important to maintain data access during multiple drive failures within a single volume set. A volume set is a collection of user data extents presented to an operating system as a range of consecutive logical block addresses (LBAs).

Each volume set may be protected using one or more different RAID levels. Commonly known RAID levels include, for example, RAID 0 (data striping), RAID 1 (disk mirroring), RAID 0+1 (data striping and disk mirroring), RAID 2 and 3 (parallel processing), RAID 4 (parity disk), RAID 5 (parity striping). RAID 1, RAID 0+1, and RAID 5 are commonly employed in distributed data storage systems. However, these data storage and access structures can generally only tolerate a single drive failure and still be able to provide complete access to the user data. If more than one drive fails at a given time, it may become extremely difficult or even impossible to recover the data from the damaged drives.

Today, several different approaches may be taken when protecting the user data in a distributed data storage system. One approach attempts to prevent a user from ever being at risk of losing data. This is accomplished by placing the volume set in a read-only mode when the volume set is in a critical state because a disk failure is detected. The user is not allowed to write data to the critical volume set while in this state, which persists until the data on the failed drive can be recovered and the failed drive can be rebuilt. The intention of this approach is to limit the amount of time that the distributed data storage system is exposed to multiple disk failures. Unfortunately, in the event of a second concurrent disk failure, the user data is lost and cannot be recovered. This is because the data from the second drive is required to recover the data from the first drive, and becomes unavailable due to the second drive failure.

Another known approach to dealing with a drive failure in a distributed data storage system is to allow the user to continue to access the data in a limited manner during multiple drive failures (as long as the failures are not complete and catastrophic failures). During the period of multiple failures, this approach attempts to keep track of the data that is in error, but still allows access to the data.

This approach presents a significant problem with regard to new data that should, but cannot be written to the critical volume set due to the drive failure. For example, the data may be cached in the storage system controller, but cannot be written to the failed target disk within the volume set. One solution is to "pin," or hold, the write data in the cache until the user either reads the data back or executes a specific command to clear the pinned data. Pinning the write data in the cache prevents the loss of any data that is already written to cache and, if the user is prevented from writing any additional data, will protect the volume set to the greatest possible extent. However, this approach is limited in the amount of data that may be pinned in the cache. Consequently, this approach may not work well when the amount of pinned data becomes larger than a small percentage of the overall available cache, because the system still needs to continue to operate with the other non-critical volume sets. Storing large amounts of pinned data in the cache may adversely affect non-critical volume sets that do not have failed drives.

Consequently a need exists for an apparatus, system, and process for maintaining data in an electronic storage array during multiple drive failures. Beneficially, such an apparatus, system, and process would allow read and write access with the critical volume set during a first drive failure and would allow read-only access during multiple drive failures. The read-only access would also preferably provide access for data recovery for the first failed drive even after the failure of a subsequent drive.

BRIEF SUMMARY OF THE INVENTION

The present invention has been developed in response to the present state of the art, and in particular, in response to the problems and needs in the art that have not yet been fully solved by currently available electronic storage arrays and storage system controllers. Accordingly, the present invention has been developed to provide an apparatus, system, and process for maintaining data in an electronic storage array during multiple drive failures that overcome many or all of the above-discussed shortcomings in the art.

The apparatus for maintaining data in an electronic storage array during multiple drive failures is provided with a logic unit containing a plurality of modules configured to functionally execute the necessary steps of maintaining data in an electronic storage array during multiple drive failures. These modules in the described embodiments include a write module, a read module, a primary response module, a secondary response module, a pinned data module, a recovery module, and a tracking module.

The apparatus, in one embodiment, is configured to recognize a first drive failure and enter a first operating mode and, subsequently, recognize a second drive failure and enter a second operating mode. The first operating mode may be initialized by the primary response module and the second operating mode may be initialized by the secondary response module. While in the first operating mode, the primary response module may be further configured to take the first failed drive off-line for recovery of the data on the first failed drive. Likewise, while in the second operating mode, the secondary response module may be further configured to place the second failed drive in a degraded but on-line state that permits limited access for recovery of the data on the first failed drive.

In a further embodiment, the pinned data module of the apparatus may be configured to store write data that is intended to be written to a failed drive while the storage system controller is operating in the second operating mode. In one embodiment, the pinned data drive may be a spare drive within the distributed data storage system. In an alternative embodiment, the pinned data drive may be a system cache within the distributed data storage system or within a host server. Regardless of the location of the pinned data drive, the pinned data module also may be configured to store a modified logging file system that maps the location of the data on the pinned data drive to the intended location of the data on the failed drive. In this way, a data access operation may be redirected from the failed drive to the pinned data drive, making limited read and write operations possible while the storage system controller is operating in the second operating mode.

In a further embodiment, the recovery module of the apparatus may be configured to recover the data on the first or second failed drive. The recovery module may employ parity data to recover the lost data from the failed drive. The recovery module may recover the lost data and store the recovered data on a spare drive within the distributed data storage system, in one embodiment, or may store the recovered data in a cache prior to writing the data to the storage array. The recovery module may also use the data stored on the pinned data drive in restoring either the first or second failed drive to an operational state.

In a further embodiment, the tracking module of the apparatus may be configured to track the location of potentially corrupt or lost data on the first and second failed drives. The tracking module may create and manage a bad block table and a bad stripe table that identify blocks and stripes of data that may contain suspect data. Suspect data may result from a partial or best-effort recovery. The bad block and bad stripe tables may be updated and the appropriate table entries removed upon writing new data to the location of the suspect data.

A system of the present invention is also presented for maintaining data in an electronic storage array during multiple drive failures. The system may be embodied in a RAID network or in a distributed data storage system. In another embodiment, the system may be embodied in a host server or in a storage system controller within the distributed data storage system.

In particular, the system, in one embodiment, includes a storage area network having a storage system controller that controls the storage of network data on a plurality of storage drives. The system also includes a primary response module, a secondary response module, a pinned data module, a recovery module, and a tracking module, each configured as described above. In a further embodiment, the system also includes a read module configured to modify a host read command to one of the plurality of storage drives and a write module configured to modify a host write command to one of the plurality of storage drives. The read and write commands may be modified during the employment of the second operating mode.

A process of the present invention is also presented for maintaining data in an electronic storage array during multiple drive failures. The process, in the disclosed embodiments, substantially includes the steps necessary to carry out the functions presented above with respect to the operation of the described apparatus and system. In one embodiment, the process includes recognizing a failure of a first drive and entering a first operating mode in response to the failure of the first drive and recognizing a failure of a second drive and entering a second operating mode in response to the failure of the second drive.

In a further embodiment, the process includes placing the first drive in an off-line state, placing the second drive in a degraded state, and making the second drive accessible for limited read and write operations while in the degraded state. The process also may include storing write data on a pinned data drive during employment of the second operating mode, mapping a first data location on the pinned data drive to a second data location on another drive within the storage array, and at least partially rebuilding the data of the first and second drives. Rebuilding the data of the first and second drives may include rebuilding the data of the first drive on a spare drive of the storage array and using data stored on a pinned data drive to rebuild the data of the second drive. The process also may include creating and maintaining a bad block table and a bad stripe table and storing a bad block identifier and a bad stripe identifier in the respective tables, the bad block identifier and bad stripe identifiers identifying the location of suspect data on one of the first and second drives.

A computer readable storage medium is also presented for storing computer code configured to carry out the process for maintaining data in a storage array during multiple drive failures.

The features and advantages of the present invention include using a new degraded drive state that allows limited and controlled access to a second failed drive in order to recover data from a first failed drive. The present invention also allows the use of a pinned data drive to temporarily store write data that could not be written to a damaged volume set during multiple drive failures. The pinned data drive protects against loss of the newly written data even though the target volume set is damaged. The present invention also provides the ability to recover a damaged volume set regardless of the number of failed drives.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
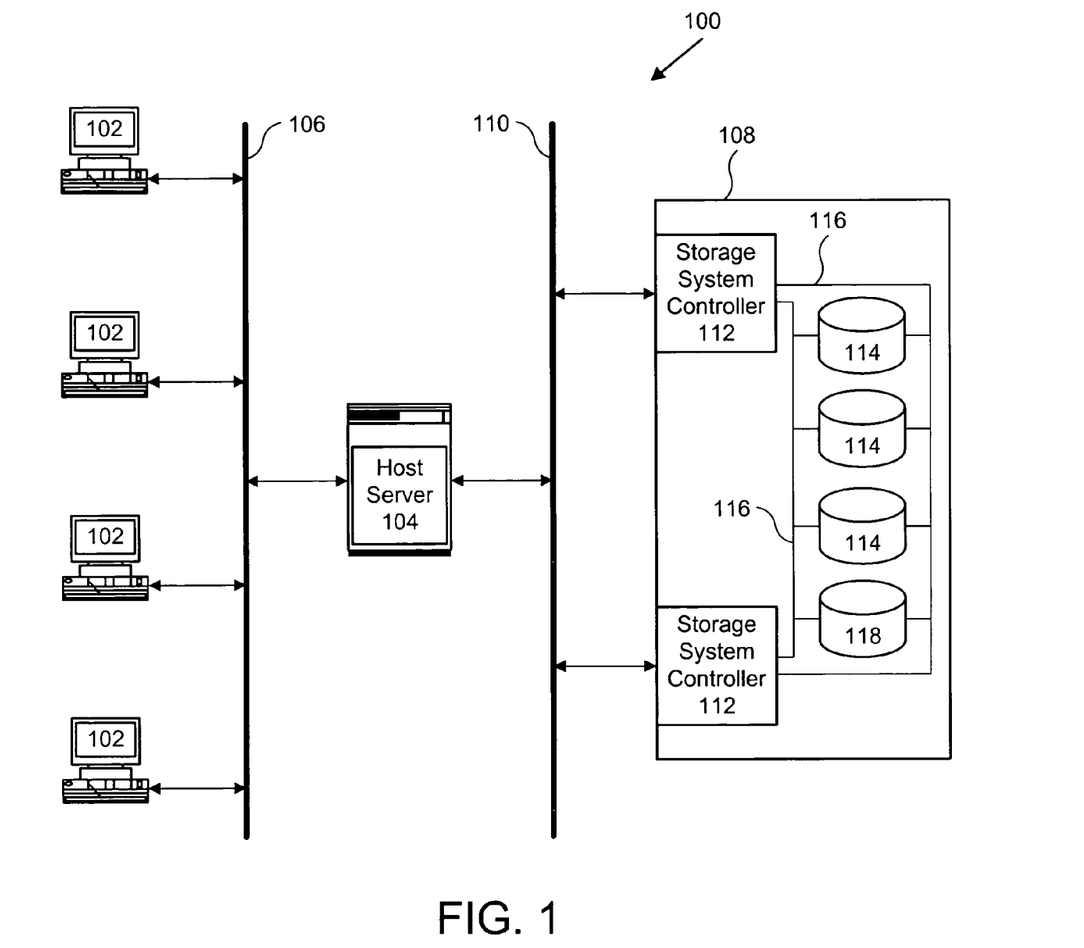
FIG. 1 is a schematic block diagram illustrating one embodiment of a RAID network in accordance with the present invention.

FIG. 1 depicts one embodiment of a redundant array of independent disks (RAID) network 100 in which the present invention may be employed for maintaining data in a storage array during multiple drive failures. The illustrated RAID network 100 given by way of example, includes a plurality of client workstations 102 and a host server 104 connected by a local area network (LAN) 106. The host server 104 is also shown connected to one or more distributed data storage systems 108 by a storage area network (SAN) 110. The storage area network 110 may be embodied in a local area network (LAN), a wide area network (WAN), or an alternate configuration. The host server 104 may be connected to the distributed data storage system 108 directly in the absence of a storage area network (SAN) 110.

The distributed data storage system 108, in the presented embodiment, includes two storage system controllers 112 that provide redundancy against a possible failure. Alternately, the distributed data storage system 108 may include only one storage system controller 112 or more than two controllers 112. Internal to the distributed data storage system 108 are a plurality of electronic storage devices 114 that are connected to the storage system controllers 112 via one or more drive interconnect communications channels 116. The electronic storage devices 114 may be hard disk drives, optical disk drives, magnetic tape drives, or another storage medium device.

The depicted RAID network 100 also includes a spare electronic storage device 118. The spare electronic storage device may be used, in one embodiment, when another electronic storage device 114 fails within the distributed data storage system 108. In an alternative embodiment, the distributed data storage system 108 may include a plurality of spare electronic storage devices 118.

Figure 2:
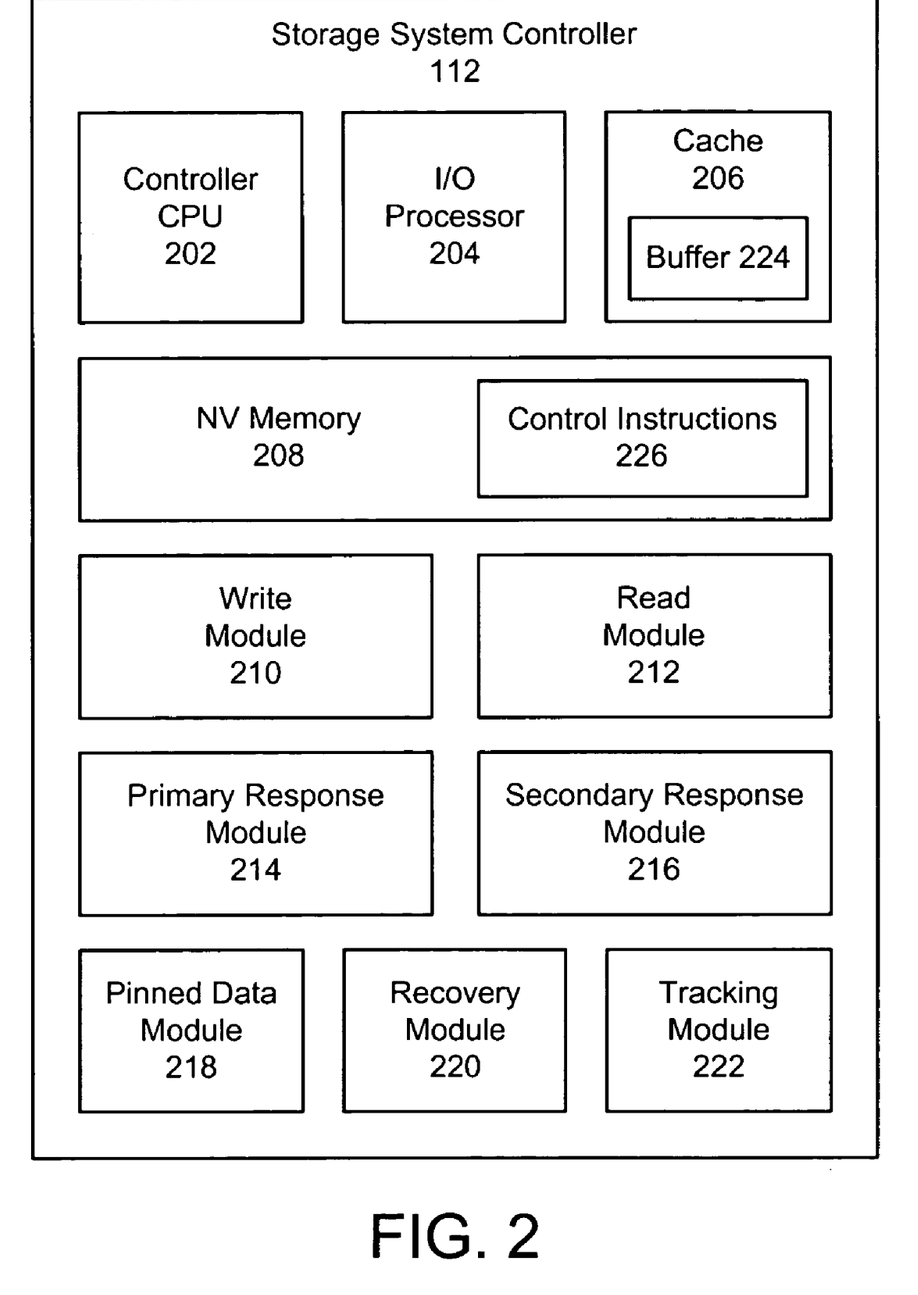
FIG. 2 is a schematic block diagram illustrating one embodiment of a storage system controller in accordance with the present invention.

FIG. 2 depicts one embodiment of the storage system controller 112 of the distributed data storage network 108 of FIG. 1. The illustrated storage system controller 112 includes a central processing unit (CPU) 202, an input/output (I/O) processor 204, a cache 206, a non-volatile (NV) memory 208, a write module 210, a read module 212, a primary response module 214, a secondary response module 216, a pinned data module 218, a recovery module 220, and a tracking module 222. In one embodiment, the cache 206 may make storage space available as a buffer 224. The NV memory 208 may include a set of control instructions 226 that contain commands used in the operation of the distributed data storage system 108.

The write module 210 may be configured in one embodiment to process a write request received from a client workstation 102 or from the host server 104. The write module 210 is also preferably configured to modify the write request as necessary to account for the first and second drive failures. The write module 210 may discontinue writing data to a first failed electronic storage device 114 and instead write data, including parity data, to the other non-failed electronic storage devices 114 within the volume set. In a further embodiment, the write module 210 may be configured to continue writing data to the second failed electronic storage device 114 and, possibly, also to a pinned data drive, in addition to the other electronic storage devices 114 within the volume set.

Similarly, the read module 212 may be configured to process a read request from a client workstation 102 or from the host server 104. The read module 212 is also preferably configured to modify the read request as necessary to account for the first and second drive failures. The read module 212 may discontinue reading data from the first failed electronic storage device 114 and instead regenerate the requested data, in conjunction with the recovery module 220, from the other drives and parity data within the volume set. During a second drive failure, the read module 212 may be configured to continue reading data from the second failed electronic storage device 114 and may read the data from the pinned data drive if the data has been stored to the pinned data drive.

The primary response module 214, in one embodiment, is configured to recognize the failure of one of the electronic storage devices 114 when all of the other electronic storage devices 114 are functioning properly. This is referred to herein as a first drive failure. The primary response module 214 recognizes a first drive failure and is further configured to enter a first operating mode of the storage system controller 112. In the case of parallel storage system controllers 112, as in FIG. 1, preferably both storage system controllers simultaneously enter the first operating mode via the primary response module 214. The first operating mode will be described in more detail with reference to the flow chart figures that follow.

The secondary response module 216, in one embodiment, is configured to recognize the failure of another electronic storage device 114 after a first drive failure and prior to rebuilding or otherwise dealing with the first drive failure. This is referred herein to as a second drive failure. During a second drive failure, two electronic storage devices 114 are recognized as at least partially in need of data recovery. A second drive failure may also include multiple drive failures during the first drive failure. For example, during a first drive failure, two more electronic storage devices 114 may each notify the storage system controller 112 of a distinct malfunction and be considered second drive failures.

The secondary response module 216 is configured to enter a second operating mode of the storage system controller 112 that is different from the first operating mode entered by the primary response module 112. A significant difference between the first operating mode and the second operating mode is that a first drive failure is handled differently by the storage system controller 112 than a second drive failure. The second operating mode and the differences between certain embodiments of the first and second operating modes will be described in more detail with reference to the flow chart figures that follow.

The pinned data module 218 is configured to store data from write operations occurring during a second drive failure that may be adversely affected by the first and second drive failures. The pinned data module 218, in one embodiment, is configured to write the data to the second failed electronic storage device 112 and may be further configured to also write the data to a pinned data drive within the distributed data storage system 108 or the host server 104. The pinned data module 218 may write the data to a write cache (not shown), or to a spare electronic storage device 118, or to both. When the write data is redirected from the second failed electronic storage device 114 to one or more pinned data drives, the pinned data module 218 may, in one embodiment, store a mapping table that designates the location of the data stored on the pinned data drive as well as the intended location of the data on the failed electronic storage device 114.

The recovery module 220 is configured, in one embodiment, to assist with the recovery of the data from the first and second failed electronic storage devices 114. The data recovery of the first and second failed electronic storage devices 114 may include a full recovery of the data on the drives or, alternatively, may include a partial, best-effort recovery of the data from the electronic storage devices 114.

The tracking module 222 of the storage system controller 112 is configured to store the location of data that has been recovered, but is suspect for whatever reason. For example, if the recovery module 222 recovers a block of data from the failed second electronic storage device 114 and stores the recovered data on a replacement spare electronic storage device 118, the quality of the recovered data may be suspect. If the recovered data is suspect, the tracking module 224 is configured to create and store an entry in, for example, a bad block table (not shown) and/or a bad stripe table (not shown) that indicates the location of the suspect data on the rebuilt electronic storage device 114. The data location may remain in the bad block and bad stripe tables, in one embodiment, until the suspect data is rewritten or overwritten with data that is not suspect.

Figure 3:
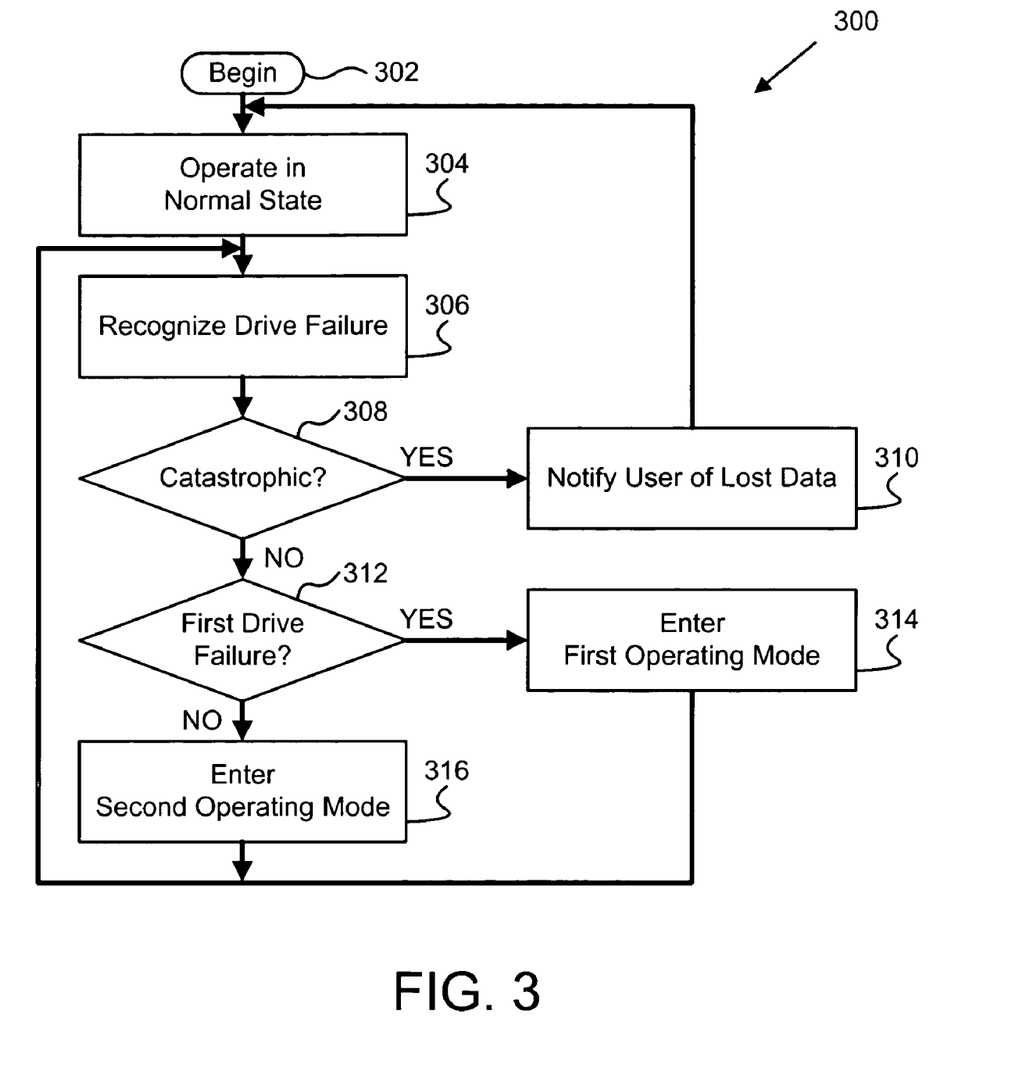
FIG. 3 is a schematic flow chart diagram illustrating one embodiment of a storage system controller operating process in accordance with the present invention.

FIG. 3 depicts one embodiment of an operating process 300 of the storage system controller 112 within the distributed data storage system 108. The illustrated operating process 300 begins 302 and the storage system controller 112 operates 304 in a normal state, writing and reading data normally within the distributed data storage system 108. The storage system controller 112 continues to operate 304 in the normal state until a drive failure is recognized 306. A drive failure may be recognized 306 by receiving a write or read error when the storage system controller 112 attempts to access one of the electronic storage devices 114. The storage system controller 112 may employ the primary response module 210 or secondary response module 212, in one embodiment, to recognize the drive failure.

The storage system controller 112, upon recognizing 306 a drive failure, determines 308 if the drive failure is catastrophic. The storage system controller 112 may determine 308 if the drive failure is catastrophic, in one embodiment, by attempting to recover the data from the failed electronic storage device 114. If the drive failure is determined 308 to be catastrophic, the storage system controller 112 notifies the host server 106 and the end user of the lost data, at which point a system administrator may employ alternate methods known in the art to attempt to recover the lost data on the failed electronic storage device 114.

If the drive failure is determined 308 to not be catastrophic, the storage system controller 112 then determines 312 if the drive failure is a first drive failure. That is, no other electronic storage devices 114 are currently off-line or otherwise malfunctioning. If the storage system controller 112 determines 312 that the drive failure is a first drive failure, the storage system controller 112 enters 314 a first operating mode via the primary response module 214. The first operating mode is shown in further detail in FIG. 4 and will be described in more detail below.

Figure 4:
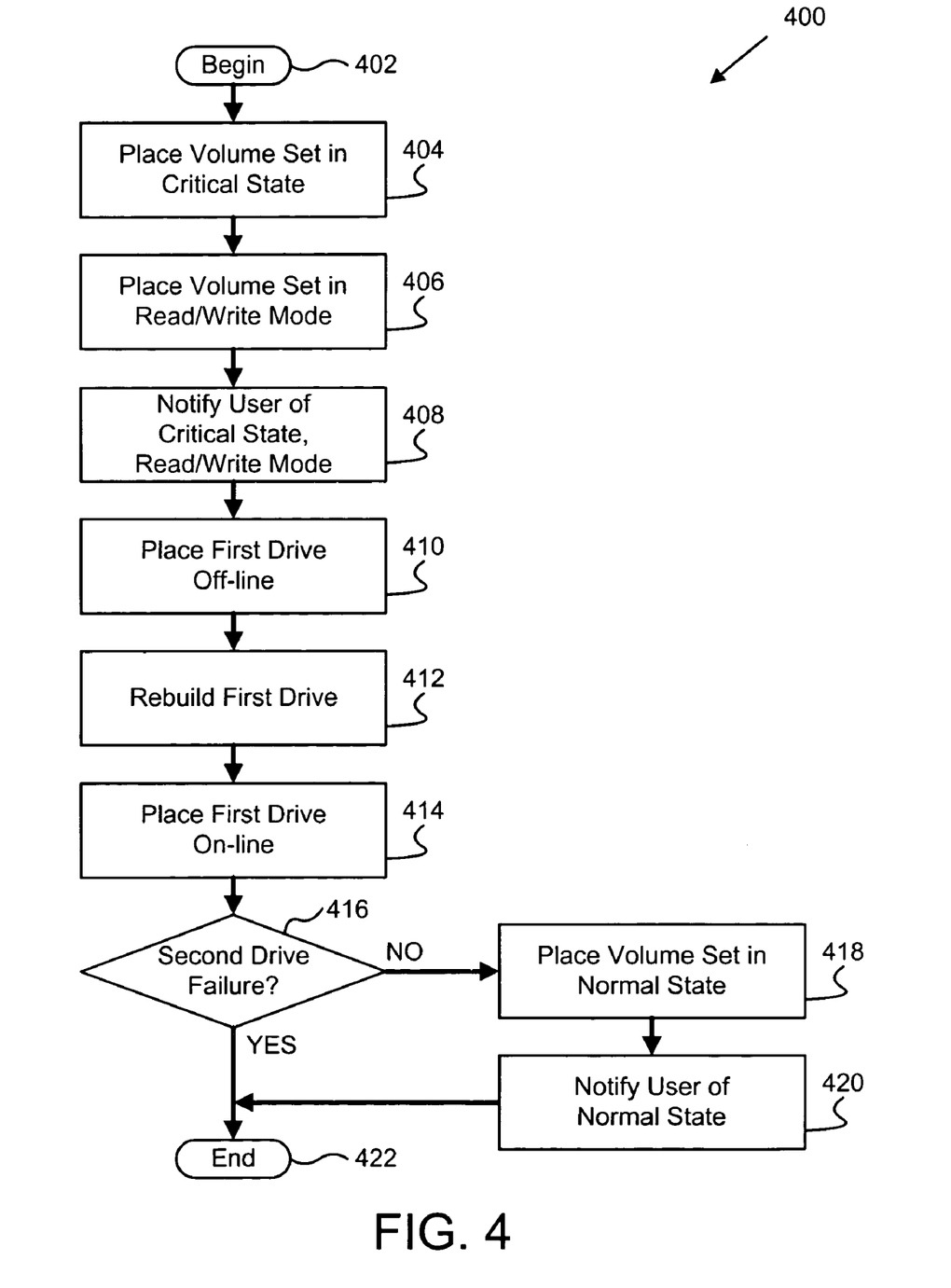
FIG. 4 is a schematic flow chart diagram illustrating one embodiment of a first operating mode process in accordance with the present invention.
Figure 5:
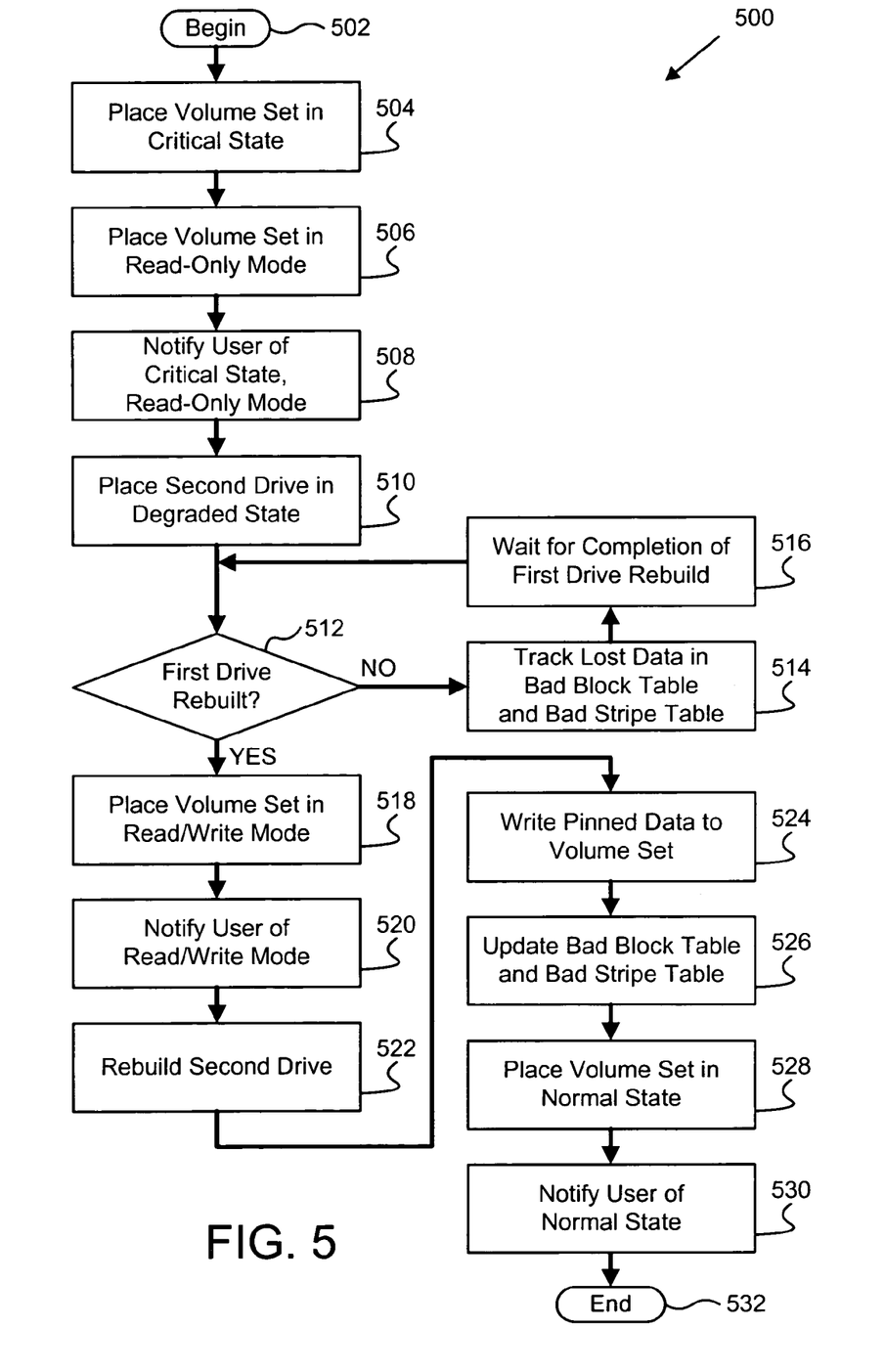
FIG. 5 is a schematic flow chart diagram illustrating one embodiment of a second operating mode process in accordance with the present invention.

Otherwise, if the storage system controller 112 determines 112 that the drive failure is a second or subsequent concurrent drive failure, the storage system controller 112 enters 316 a second operating mode via the secondary response module 216. The second operating mode is shown in further detail in FIG. 5 and will be described in greater detail below. FIGS. 4 and 5 also describe the circumstances under which the storage system controller 112 may return to operate 304 in a normal state when all of the electronic storage devices 114 are presumed to be operating normally.

After entering 314 the first operating mode or entering 316 the second operating mode, the storage system controller 112 continues to monitor the distributed data storage system 108 for subsequent drive failures. Upon recognizing 306 a subsequent drive failure, the storage system controller 112 repeats the steps outlined in FIG. 3 and described above.

FIG. 4 depicts one embodiment of a first operating mode process 400 that may be employed during the failure of a single electronic operating device 114. The first operating mode process 400 shown begins 402 after the storage system controller 112 recognizes a first drive failure, as described above. After entering 314 the first operating mode, the storage system controller 112 places 404 the volume set in a critical state. The volume set includes the first failed electronic storage device 114 and additional electronic storage devices 114 that are used to store the related data blocks and parity data.

The storage system controller 112 then places 406 the volume set in a modified read/write mode in which data is not written to or read from the failed electronic storage device 114. Rather, data is written to and read from the other electronic storage devices 114 within the volume set using the parity data as generated by know parity algorithms and methods. In one embodiment, the write module 210 and read module 212 may be used to institute the modified read/write mode. The storage system controller 112 also may notify 408 the user or system administrator of the critical state and modified read/write mode of the volume set.

While the volume set is in a critical state, the storage system controller 112 places the first failed electronic storage device 114 off-line so that data is neither written to nor read from the first failed electronic storage device 114. The first failed electronic storage device 114 is then rebuilt 412 using conventional recovery methods and, in one embodiment, using a spare electronic storage device 118 within the distributed data storage system 108. The storage system controller 112 may employ the recovery module 220 to rebuild the first failed electronic storage device 114.

After the first failed electronic storage device 114 is rebuilt 412, the storage system controller 112 places 414 the rebuilt electronic storage device 114 back on-line. Meanwhile, the operating process 300, as shown in FIG. 3, continues to monitor the distributed data storage system 108 for additional drive failures. While in the first operating mode and, in one embodiment, after placing 414 the rebuilt electronic storage device 114 back on-line, the storage system controller 112 determines 416 if another electronic storage device 114 failed during the critical period of the first failed electronic storage device 114. In one embodiment, the storage system controller 112 may employ the secondary response module 216 to recognize a subsequent drive failure. If no other electronic storage devices 114 failed during this period, the storage system controller 112 places 418 the volume set back in a normal operating state and, in one embodiment, notifies 420 the user or system administrator of the transition back to a normal state.

After notifying 420 the user of the normal state, or after determining 416 that another electronic storage device 114 failed during the critical period of the first failed electronic storage device 114, the first operating mode process 400 ends. The storage system controller 112 then operates in either the normal state or second operating mode according to the operating process 300 illustrated in FIG. 3.

FIG. 5 depicts one embodiment of a second operating mode process 500 that may be employed during the concurrent failure of two or more electronic operating devices 114 within a volume set. The second operating mode process 500 as shown begins 502 after the storage system controller 112 recognizes a second or subsequent drive failure, as described above. After entering 316 the second operating mode, the storage system controller 112 places 504 the volume set in a critical state.

The storage system controller 112 then places 506 the volume set in a read-only mode in which data is not written to or read from any of the electronic storage devices 114, including the first and second failed electronic storage devices 114, of the affected volume set. The write module 210 and read module 212 may be used to institute the read-only mode. In one embodiment, the storage system controller 112 may also notify 508 the user or system administrator of the critical state and read-only mode of the volume set.

While operating in the second operating mode, the first failed electronic storage device 114 is off-line, as described above. The storage system controller 112 places 510 the second failed electronic storage device 114 in a degraded state, rather than placing the second failed electronic storage device 114 off-line. In this degraded state, the storage system controller 112 in one embodiment attempts to continue reading data from the second failed storage device 114. The storage system controller 112 may additionally or alternatively read the requested data from a pinned data drive if the requested data is resident on the pinned data drive.

With the second failed electronic storage device 114 in a degraded state, the storage system controller 112 determines 512 if the first failed electronic storage device 114 has been rebuilt 412 yet. In one embodiment, the storage system controller 112 may employ the primary response module 214 and recovery module 220 to determine 512 if the first failed electronic storage device 114 has been rebuilt 412. If the first failed electronic storage device 114 has not yet been rebuilt 412, the storage system controller 112 tracks 514 the location of potentially corrupt or lost data, in one embodiment, using a bad block table and a bad stripe table. In one embodiment, the storage system controller 112 may employ the tracking module 222 to create an entry in the bad block table and the bad stripe table.

The bad block table may be configured to store a bad block identifier that identifies the location of a potentially bad block of data. Likewise, the bad stripe table may be configured to store a bad stripe identifier that identifies the location of a potentially bad stripe of data. The bad block table and the bad stripe table are preferably stored in a known configuration space on a disk, such as on the host server 104. In an alternative embodiment, the bad block table and bad stripe table may be stored on the cache 206 of the storage system controller 112 or on an electronic storage device 114 within a non-critical volume set in the distributed data storage system 108.

The storage system controller 112 continues to track 514 the potentially corrupt or lost data while waiting 516 for the first failed electronic storage device 114 to be as fully rebuilt 412 as possible, though the complete recovery of all of the data from the first failed electronic storage device 114 may be impossible due to the concurrent failure of the second failed electronic storage device 114.

After determining 512 that the first failed electronic storage device 114 has been rebuilt 412 and placed 414 back on-line, the storage system controller 112 may place 518 the volume set back into a modified read/write mode that is in one embodiment similar to the modified read/write mode described above. In one embodiment, the write module 210 and read module 212 may be used to implement the modified read/write mode.

The storage system controller 112 may also notify the user or system administrator that the volume set is now in a modified read/write mode. The storage system controller 112 then rebuilds 522 the second failed electronic storage device 114 to the extent possible, though the complete recovery of all of the data from the second failed electronic storage device 114 may be impossible due to the concurrent failure of the first failed electronic storage device 114. In one embodiment, the storage system controller 112 may employ the recovery module 220 to rebuild 522 the second failed electronic storage device 114.

After rebuilding 522 the second failed electronic storage device 114 to the extent possible, the storage system controller 112 then accesses the data, if any, stored on the pinned data drive. In one embodiment, the recovery module 220, pinned data module 218, read module 212, and write module 210 may be employed to write 524 the pinned data to the rebuilt 522 electronic storage device 114. The process of writing 524 data to the pinned data drive will be discussed in more detail with reference to FIG. 6 that follows. If new data from the pinned data drive is written 524 to any potentially corrupt or lost data locations, the storage system controller 112 updates 526 the bad block table and bad stripe table to remove the corresponding entries from the respective tables. In one embodiment, the storage system controller 112 may employ the tracking module 222 to update the bad block and bad stripe tables.

The storage system controller 112 then places 528 the volume set back in a normal operating state and, in one embodiment, notifies 530 the user or system administrator of the normal operating state. The depicted second operating mode process 500 then ends 532.

Figure 6:
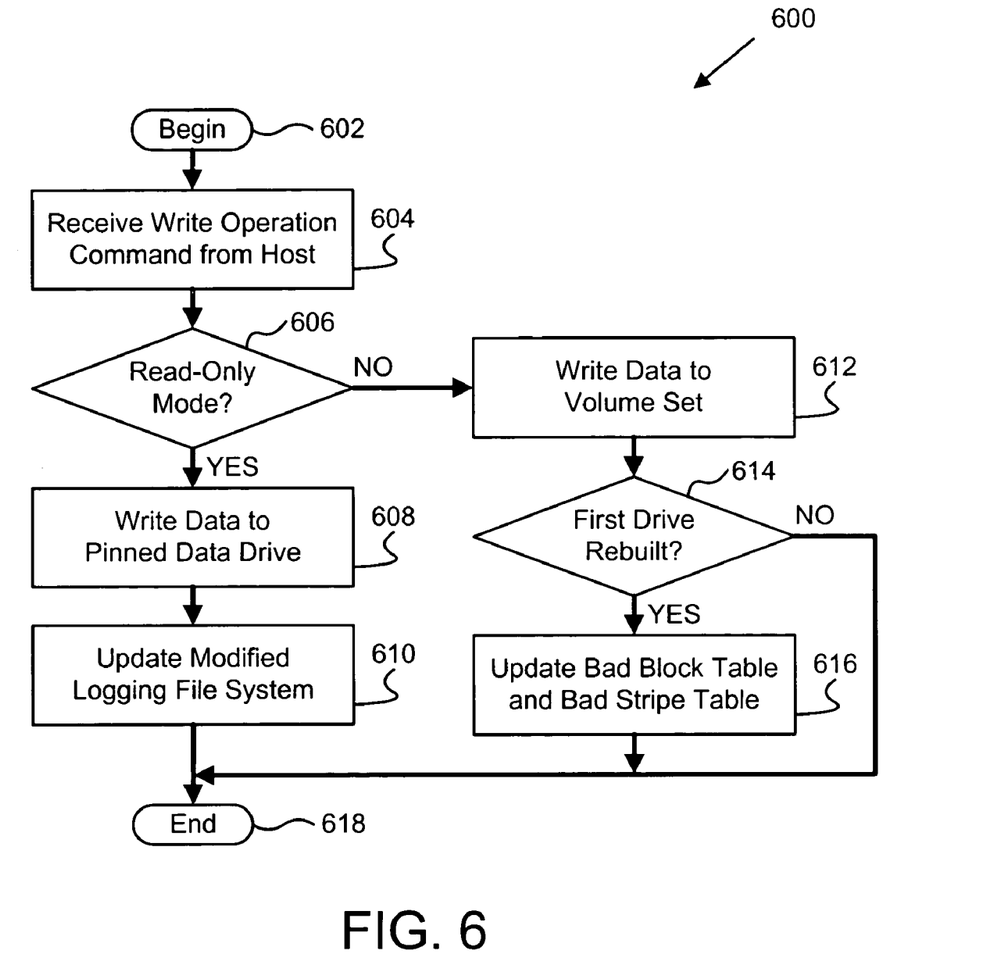
FIG. 6 is a schematic flow chart diagram illustrating one embodiment of a write process in accordance with the present invention.

FIG. 6 depicts one embodiment of a write process 600 that may be employed when the storage system controller 112 is operating in the second operating mode described above. Even though the storage system controller 112 places 506 a volume set in a read-only mode during at least part of a second drive failure, the host server 104 continues to attempt to write data to the critical volume set. The illustrated write process 600 begins 602 when the storage system controller 112 receives 604 a write operation command from the host server 104. The storage system controller 112 determines 606 if the target volume set is in a read-only mode and, if so, writes 608 the data to a pinned data drive rather than to the target volume set.

The pinned data drive, in one embodiment, is a spare electronic storage device 118 that is used to buffer data while a critical volume set is in a read-only mode during multiple, concurrent drive failures. In an alternative embodiment, the pinned data drive may be embodied in the cache 206 of the storage system controller 112. In a further embodiment, the pinned data drive may be embodied in another storage device within the depicted RAID network 100. After the data is written 608 to the pinned data drive, the storage system controller 112 updates 610 a modified logging file system that maps the data on the pinned data drive to a target location on an electronic storage device 114 within the critical volume set. In one embodiment, the storage system controller 112 may employ the pinned data drive 218 to update 610 the modified logging file system.

If the storage system controller 112 determines 606 that the target volume set is not in a read-only mode, the storage system controller 112 writes 612 the data to the target volume set, such as using the write module 210. The storage system controller 112 also may determine 614 if the first failed electronic storage device 114 has been rebuilt 412 and, if so, update the bad block and bad stripe tables to indicate that new data has been written 612 over suspect data. In one embodiment, the storage system controller 112 may employ the primary response module 214 and the recovery module 220 to determine 514 if the first failed electronic storage device 114 has been rebuilt 412. Likewise, the storage system controller 112 may employ the tracking module 222 to update the bad block and bad stripe tables. The depicted write process 600 then ends.

Figure 7:
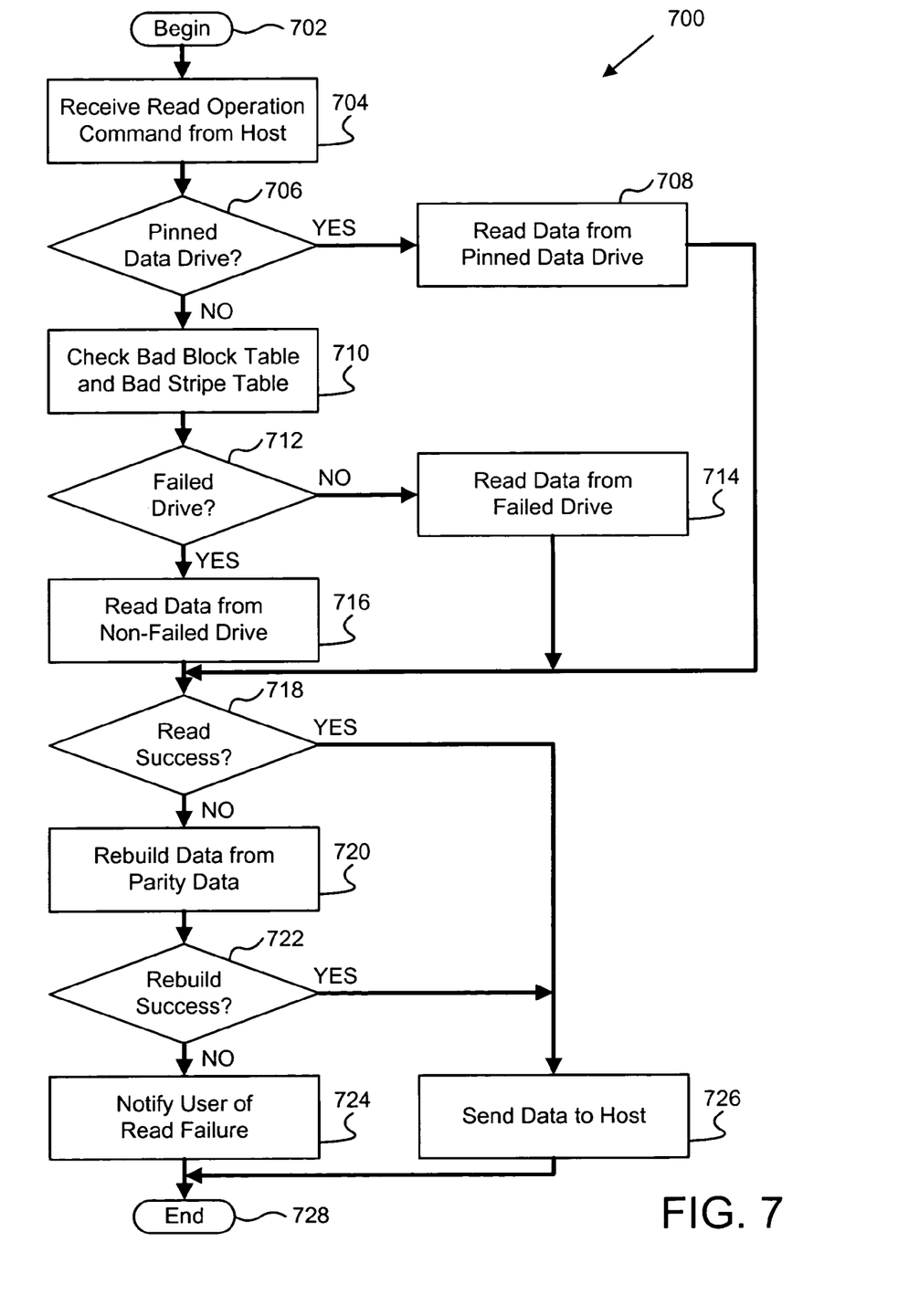
FIG. 7 is a schematic flow chart diagram illustrating one embodiment of a read process in accordance with the present invention.

FIG. 7 illustrates one embodiment of a read process 700 that may be employed when the storage system controller 112 is operating in the second operating mode described above. The read process 700 shown begins 702 when the storage system controller 112 receives 704 a read operation command from the host server 104.

Upon receiving 704 the read operation command, the storage system controller 112 determines 706 if the requested data is on the pinned data drive and, if so, reads 708 the requested data from the pinned data drive, using in one embodiment, the pinned data module 218 and read module 212. In one embodiment, the storage system controller 112 queries the modified logging file system to determine 706 if the request data is on the pinned data drive.

If the storage system controller 112 determines 706 that the requested data is not on the pinned data drive, the storage system controller 112 may check 710, in one embodiment, the bad block table and the bad stripe table to see if the requested data is stored in a location that is suspect. In one embodiment, the tracking module 222 may be employed to check the bad block table and the bad stripe table. The storage system controller 112 then determines 712 if the requested data is on a failed electronic storage device 114. If the requested data is on a failed electronic storage device 114, the storage system controller 112 attempts to read 714 the data from the failed electronic storage device 114. Otherwise, the storage system controller 112 attempts to read 716 the data from a non-failed electronic storage device 114.

After attempting to read 708 the data from the pinned data drive, to read 714 the data from a failed electronic storage device 114, or to read the data from a non-failed electronic storage device 114, the storage system controller 112 determines 718 if the data was successfully read 708, 714, 716. If the data was not successfully read 708, 714, 716, the storage system controller 112 attempts to rebuild 720 the data from the associated parity data. If the storage system controller determines 722 that the recovery 720 of the data using the parity data was not successful, the storage system controller 112 notifies 724 the requesting user or application of the read failure.

If the storage system controller 112 determines 718 that the data was successfully read 708, 714, 716 or recovered 720 from the parity data, the storage system controller 112 sends 726 the requested data to the host server 104 for processing. The depicted read process 700 then ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for maintaining data in an electronic storage array during multiple drive failures, the apparatus comprising:
    a primary response module configured to recognize a failure of a first drive of a plurality of storage drives forming volume set accessible to a storage controller and to enter a first operating mode in response to the failure of the first drive, the first operating mode comprising placing the first drive in an off line state and placing the volume set in a modified read/write mode using non-failed drives of the volume set; and
    a secondary response module configured to recognize a failure of a second drive of the volume set and to enter a second operating mode in response to the failure of the second drive, the second operating mode comprising placing the drives of the volume set in a read-only mode with the failed second drive in a degraded state wherein the storage controller attempts to read requested data from the failed second drive and from a pinned data drive in response to the requested data being unavailable from the failed second drive.

2. The apparatus of claim 1, wherein the primary response module is further configured to place the volume set in a critical state.

3. The apparatus of claim 2, further comprising notifying a user that the volume set is in a critical state.

4. The apparatus of claim 1, wherein the primary response module returns the volume set to a normal state in response to the first failed drive being rebuilt and the secondary response module not detecting a second drive failure.

5. The apparatus of claim 1, further comprising a pinned data module configured to store write data intended for storage on the volume set on the pinned data drive without storing the write data on a drive of the volume set during employment of the second operating mode.

6. The apparatus of claim 5, wherein the pinned data drive is a system cache of the storage array storage controller with access to the volume set.

7. The apparatus of claim 5, wherein the pinned data drive is a spare drive of the volume set.

8. The apparatus of claim 5, wherein the pinned data module is further configured to map a first data location on the pinned data drive to a second data location on another drive within the volume set.

9. The apparatus of claim 1, further comprising a recovery module configured to at least partially rebuild data of the first and second drives.

10. The apparatus of claim 9, wherein the recovery module is further configured to at least partially rebuild the data of the first drive on a spare drive of the electronic storage array.

11. The apparatus of claim 9, wherein the recovery module is further configured to at least partially rebuild the data of the second drive using data stored on a pinned data drive.

12. The apparatus of claim 1, further comprising a tracking module configured to create a bad block table and a bad stripe table and store a bad block identifier and a bad stripe identifier in the respective tables, the bad block identifier and bad stripe identifiers identifying the location of suspect data on one of the first and second drives.

13. The apparatus of claim 12, wherein the tracking module is further configured to maintain the bad block identifier and the bad stripe identifier of the location of the suspect data until the data stored in the location is no longer suspect.

14. A system for maintaining data in an electronic storage array during multiple drive failures, the system comprising:
 a storage area network having a storage controller that controls storage of network data on a plurality of storage drives, the plurality of storage derives forming a volume set;
 a primary response module configured to recognize a failure of a first drive of the plurality of storage drives and to enter a first operating mode in response to the failure of the first drive and to place the first drive in an off-line state and placing the plurality of storage drives in a modified read/write mode using non-failed drives of the plurality of storage drives;
 a secondary response module configured to recognize a failure of a second drive of the plurality of storage drives and to enter a second operating mode in response to the failure of the second drive and to place the second drive in a degraded state wherein the storage controller attempts to read requested data from the failed second drive and from a pinned data drive in response to the requested data being unavailable from the failed second drive;
 a read module configured to modify a host read command to one of the plurality of storage drives during the employment of the second operating mode;
 a write module configured to modify a host write command to one of the plurality of storage drives during the employment of the second operating mode;
 a pinned data module configured to store write data intended for storage on the volume set on the pinned data drive without storing the write data on a drive of the volume set during employment of the second operating mode;
 a recovery module configured to at least partially rebuild data of the first and second drives; and
 a tracking module configured to create a bad block table and a bad stripe table and store a bad block identifier and a bad stripe identifier in the respective tables, the bad block identifier and bad stripe identifiers identifying the location of suspect data on one of the first and second drives.

15. A process for maintaining data in an electronic storage array during multiple drive failures, the process comprising:
 recognizing a failure of a first drive of a plurality of storage drives forming volume set accessible to a storage controller and entering a first operating mode in response to the failure of the first drive, the first operating mode comprising placing the first drive in an off-line state and placing the volume set in a modified read/write mode using non-failed drives of the volume set; and
 recognizing a failure of a second drive of the volume set and entering a second operating mode in response to the failure of the second drive, the second operating mode comprising placing the drives of the volume set in a read-only mode with the failed second drive in a degraded state wherein the storage controller attempts to read requested data from the failed second drive and from a pinned data drive in response to the requested data being unavailable from the failed second drive.

16. The process of claim 15, further comprising storing write data on the pinned data drive during employment of the second operating mode.

17. A computer readable storage medium comprising computer readable code configured to carry out a process for maintaining data in an electronic storage array during multiple drive failures, the process comprising:
 recognizing a failure of a first drive of a plurality of storage drives forming volume set accessible to a storage controller and entering a first operating mode in response to the failure of the first drive, the first operating mode comprising placing the first drive in an off-line state and placing the volume set in a modified read/write mode using non-failed drives of the volume set; and
 recognizing a failure of a second drive of the volume set and entering a second operating mode in response to the failure of the second drive, the second operating mode comprising placing the drives of the volume set in a read-only mode with the failed second drive in a degraded state wherein the storage controller attempts to read requested data from the failed second drive and from a pinned data drive in response to the requested data being unavailable from the failed second drive.

18. The computer readable storage medium of claim 17, wherein entering a first operating mode further comprises placing the volume set in a critical state.

19. The computer readable storage medium of claim 18, further comprising notifying a user that the volume set is in a critical state.

20. The computer readable storage medium of claim 17, further comprising returning the volume set to a normal state in response to the first failed drive being rebuilt and the secondary response module not detecting a second drive failure.

21. The computer readable storage medium of claim 17, further comprising storing write data intended for storage on the volume set on the pinned data drive without storing the write data on a drive of the volume set during employment of the second operating mode.

22. The computer readable storage medium of claim 21, wherein storage write data on a pinned data drive comprises storing data on a system cache of the storage controller with access to the volume set.

23. The computer readable storage medium of claim 21, wherein storage write data on a pinned data drive comprises storing data on a spare drive of the volume set.

24. The computer readable storage medium of claim 21, further comprising mapping a first data location on the pinned data drive to a second data location on another drive within the volume set.

25. The computer readable storage medium of claim 17, further comprising at least partially rebuilding data of the first and second drives.

26. The computer readable storage medium of claim 25, further comprising at least partially rebuilding the data of the first drive on a spare drive of the electronic storage array.

27. The computer readable storage medium of claim 25, further comprising at least partially rebuilding the data of the second drive using data stored on a pinned data drive.

28. The computer readable storage medium of claim 17 further comprising creating a bad block table and storing a bad block identifier and a bad stripe identifier in the respective tables, the bad block identifier and bad stripe identifiers identifying the location of suspect data on one of the first and second drives.

29. The computer readable storage medium of claim of 28, further comprising maintaining the bad block identifier and the bad stripe identifier of the location of the suspect data until the data stored in the location is no longer suspect.

30. An apparatus for maintaining data in an electronic storage array during multiple drive failures, the apparatus comprising:

means for recognizing a failure of a first drive of a plurality of storage drives forming volume set accessible to a storage controller and entering a first operating mode in response to the failure of the first drive, the first operating mode comprising placing the first drive in an off line state and placing the volume set in a modified read/write mode using non-failed drives of the volume set; and means for recognizing a failure of a second drive of the volume set and entering a second operating mode in response to the failure of the second drive, the second operating mode comprising placing the drives of the volume set in a read-only mode with the failed second drive in a degraded state wherein the storage controller attempts to read requested data from the failed second drive and from a pinned data drive in response to the requested data being unavailable from the failed second drive.

* * * * *